June 10, 1958     H. L. ANDERSON     2,838,262
SUPPORT FOR AN ELECTRIC MOTOR
Filed Feb. 6, 1956
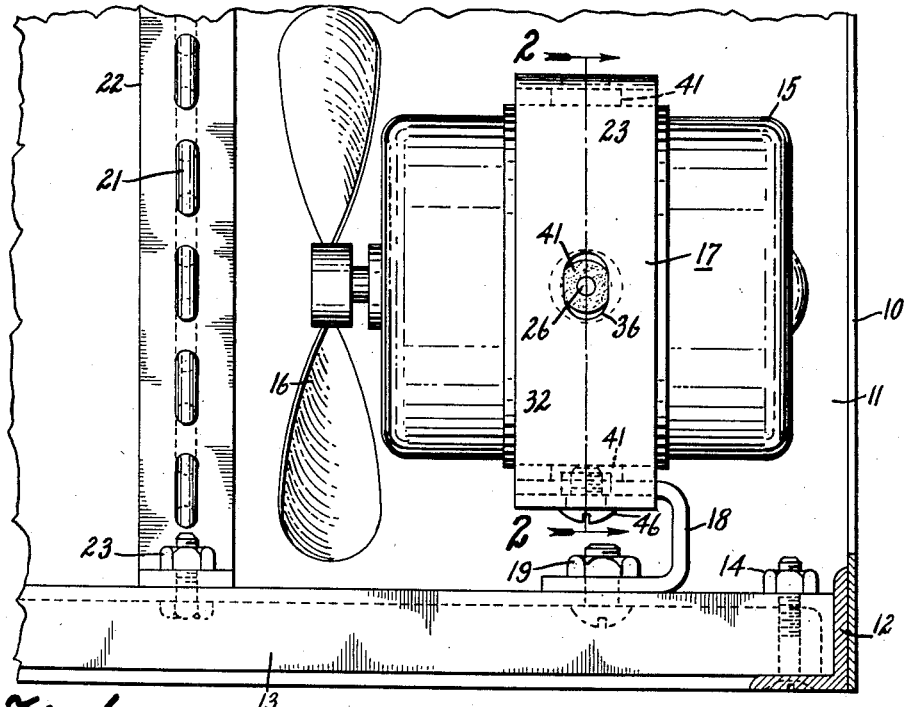
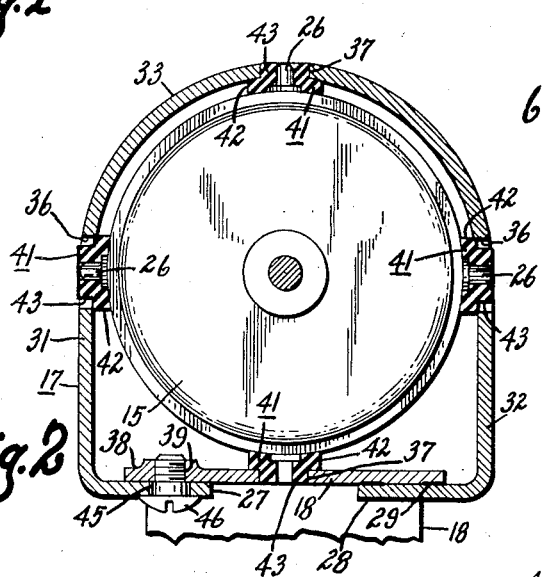
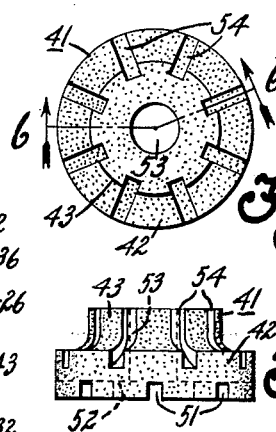
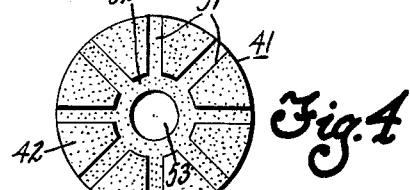
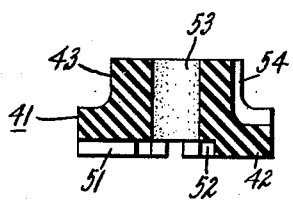
INVENTOR.
HAROLD L. ANDERSON
BY R. R. Candor.
HIS ATTORNEY.

United States Patent Office 2,838,262
Patented June 10, 1958

2,838,262

SUPPORT FOR AN ELECTRIC MOTOR

Harold L. Anderson, Fairborn, Ohio, assignor to General Motors Corporation, Detroit, Mich., a corporation of Delaware Application February 6, 1956, Serial No. 563,558

1 Claim. (Cl. 248—26)

This invention relates to refrigerating apparatus and particularly to an arrangement for carrying an operating member of such apparatus upon a support on a part of a refrigerator cabinet.

In refrigerating apparatuses of this type comprising a refrigerator cabinet having a closed refrigerating system associated therewith and including a refrigerant translating unit located in a machine compartment of the cabinet and provided with a condenser and a motor driven fan or blower for circulating air over the condenser, a problem of preventing high frequency vibrations or noises of the fan and motor being transmitted to and amplified by the cabinet is present. This is particularly true of present day refrigerators wherein the condenser and fan motor support as well as walls of the cabinet are constructed of metal and the cabinet forms an amplifying box or its walls form amplifying boards for operating members mounted in the cabinet. I therefore propose yieldable mounting means for a condenser fan motor in the machine compartment of a refrigerator cabinet which while isolating the motor out of metal to metal contact with its metal supporting bracket is readily compressible to facilitate assembly of the motor to its bracket, is highly resilient after being compressed and yet is sturdy and capable of withstanding shocks or jars.

An object of my invention is to provide a simplified, rugged and long life yieldable mounting for a fan motor in a refrigerator cabinet while at the same time being of sufficient resiliency to cushion and prevent transmission of high frequency vibrations or noises of the motor and its driven fan to a supporting bracket therefor.

Another object of my invention is to provide a yieldable connecting rubber-like bushing element between an operating member and a supporting bracket member therefore with grooves located on opposite sides thereof and arranged in staggered relationship with respect to one another so as to form pockets for the rubber to flow and partially fill in during relative movement between the members.

A further and more specific object of my invention is to yieldably mount a motor upon a metal supporting bracket secured to a metal support in a refrigerator cabinet with resilient rubber-like elements which are compressed between the motor and bracket by drawing ends of a split portion of the bracket together and tying the split ends to thereby maintain the elements under compression to hold the motor in place and reduce the transmission of noise and vibrations of the motor to the bracket and its support.

Further objects and advantages of the present invention will be apparent from the following description, reference being had to the accompanying drawings, wherein a preferred form of the present invention is clearly shown.

In the drawings:

Figure 1 is a fragmentary side view of a motor driven fan employed to circulate air over a condenser of a refrigerant translating unit located in a machine compartment of a refrigerator cabinet and mounted on a bracket in accordance with this invention;

Figure 2 is a sectional view taken on the line 2—2 of Figure 1 showing a split bracket surrounding the fan motor and clamping resilient elements between the motor and the bracket;

Figure 3 is a side elevational view of a rubber-like resilient element used in mounting the motor to its carrying bracket;

Figure 4 is an end view of the flat side of the base portion of the element shown in Figure 3;

Figure 5 is an end view of the reduced portion of the element shown in Figure 3; and Figure 6 is a sectional view of the resilient element taken on the line 6—6 of Figure 5 illustrating the staggered relation of grooves therein.

Referring to the drawings, wherein a preferred embodiment of my invention is disclosed, reference numeral 10 in Figure 1 thereof indicates a metal wall or walls of a refrigerator cabinet having a machine compartment 11 provided in its lower portion. An angle iron base frame 12 extends around the bottom of the compartment 11 and a metal frame 13 within this compartment is rigidly secured by bolts or the like 14 to a part of cabinet 10, base frame 12, and forms a support for carrying a motor 15, a fan 16 driven thereby and a split spring metal mounting bracket, generally represented by the reference numeral 17, for the motor 15. Bracket 17 includes an integral lower leg 18 which is rigidly secured to frame 13 by bolts 19. The Motor 15 operates fan or blower 16 to circulate air over a finned conduit coil condenser portion or element 21 of a refrigerant translating unit (not shown) within compartment 11 of a closed refrigerating system associated with cabinet 10. Condenser 21 is provided with end plates 22 which are secured to frame 13 by bolts or the like 23. Also included in the closed refrigerating system is an evaporator (not shown) connected by conduits to the refrigerant translating unit and employed to cool the interior of a food storage chamber in the cabinet and located above the machine compartment 11 thereof. The construction and operation of a refrigerating system associated with a refrigerator cabinet together with the function of dissipating heat from the condenser 21, in being cooled by air circulated thereover by fan or blower 16, is well known to those skilled in the art and needs no enlarged description herein. Motor 15 operates at a relatively fast speed and in so operating both the motor and the blades of fan 16 driven thereby create or generate high frequency vibrations and sounds which are sometimes more objectionable than stronger or greater vibrations when transmitted to the refrigerator cabinet and to the room in which the cabinet is located.

The motor 15 comprises the usual metal cylindrical housing enclosing electrically energized parts and its operating shaft upon one end of which the fan or blower 16 is mounted. Motor 15 has three metal studs 26 welded or otherwise suitably secured to its housing and projecting outwardly therefrom at three equally spaced apart points such, for example, at the top thereof and at two of its opposed sides (see Figure 2). The bracket 17 includes a split spring strap-like portion having ends 27 and 28 and the leg 18 thereof, which is secured to the metal frame or support 13, is welded or brazed as at 29 to secure same to the bracket. The strap portion of bracket 17 includes two opposed legs 31 and 32 having an arcuate connecting part 33. Spring strap-like portion of bracket 17 extends around opposite sides of motor 15 and over the top thereof. A pair of elongated openings 36 are provided in the strap portion of bracket 17 and are located in opposed legs 31 and 32 thereof. A hole 37 is provided in the top and in the bottom parts of the bracket for a purpose to be presently described. The one side of leg 18 opposite the side thereof welded to end 28 of bracket 17 provides the split bracket with a loose or free end 38 which is tapped and threaded as at 39.

In assembling the motor 15 to bracket 17 a yieldable or resilient cylindrical rubber-like shouldered bushing element, generally represented at 41 in Figure 2 of the drawings, is placed over each of the three studs 26 on the motor and a fourth element 41 is placed between the horizontal part of leg 18 of the bracket and the bottom of the motor housing. Each bushing element 41 has flat surfaced ends, a base portion 42 and a shouldered reduced portion 43. After the three rubber-like bushing elements 41 have been placed over studs 26 the reduced portion 43 of the fourth element is compressed and inserted in the hole 37 in the bottom part of bracket 17. Then the motor 15 is moved into its surrounding bracket 17 to rest on the lower or fourth bushing 41 and thereafter the free ends 27 and 38 of the bracket are drawn or forced together against the spring tension of its strap portion to bring a hole 45, provided in the free end 27 of the strap portion of bracket 17, into registry with the threaded hole 39 in the free end 38. This compresses the yieldable rubber-like bushing elements 41, with their reduced portion 43 fitting and compressed in the hole 37 and openings 36, between the motor 15 and its surrounding bracket 17. A screw 46 is now inserted in hole 45 and turned into the threaded hole 39 at the end 38 of the bracket to mount motor 15 to bracket 17, to securely tie the ends 27 and 38 to one another and to maintain the bushings 41 under compression. The compressing of the three bushings 41 causes the fourth bushing at the lower portion of bracket 17 to also be compressed between leg 18 and motor 15.

While the assembling operation described may seem relatively simple it is not quite as easy or simple when employing yieldable bushings devoid of serrations or grooves in surfaces thereof. For example, this operation has been found to be very difficult and to require a considerable amount of or too much time. I found, by providing the bushings with serrations or grooves in certain surfaces thereof, that during the clamping of ends 27 and 38 of the spring strap portion of bracket 17 together the rubber of the bushings would readily flow into and tend to fill the serrations or grooves instead of necessitating abnormal deformation of the bushings. The provision of grooves in the bushings provides same with greater compressibility to render the assembly of motor 15 and bracket 17 much easier and capable of being carried out in less time. In addition to this I discovered that serrations or grooves in the rubber-like bushing elements, if arranged in a certain manner therein with respect to one another, will increase the resiliency thereof after they have been compressed. Thus, the yieldable rubber-like bushing elements 41 in the present disclosure are provided with grooves 51 in the flat surface at the end of the base portion 42 thereof (see Figures 3, 4 and 6). Grooves 51 are spaced apart and extend radially from a counterbore 52 provided in the flat end of base portion 42 and enlarged with respect to a hole 53 extending through the bushing. These grooves 51 extend through the periphery or peripheral edge of the bushing. The grooves 51 are of a depth substantially equal to the depth of the counterbore 52. Grooves 54, of approximately the same depth as grooves 51, are arranged in spaced apart relation on the other side of base 42 of bushings 41 and these grooves 54 also extend radially from the center of the bushings through their peripheral edge. The grooves 54 furthermore extend lengthwise of the bushing along the peripheral edge of the reduced portion 43 thereof through the flat end surface (see Figures 3, 5 and 6). It is to be noted that I arrange the two sets of grooves 51 and 54 in staggered relation to one another. By so staggering the grooves I provide a groove 51 on one side of the base 42 of each bushing 41 which is located between two of the grooves 54 on the opposite side of base 42. In this manner the material of the bushings is rendered freer to flow into the spaces provided by the grooves when a compressive force is applied through the base 42 or when such force is applied in a direction across the peripheral edge of the reduced portion 43 of the bushings such as occurs when inserting the reduced end portion 43 thereof into the holes 37 and into the elongated openings 36. Such staggering of the grooves 51 and 54 permit the retention of a predetermined desired length or thickness and diameter of the bushings 41 for spacing and isolating purposes between the members to be connected together.

In the present disclosure the rubber-like bushings 41 are placed over the studs 26 with the counterbore 52 thereof receiving a head part of the studs so that the grooved or fluted flat surface on the base 42 of the bushings may be clamped or compressed against the housing of motor 15. The reduced end portion 43 of the bushing elements 41 is compressed between opposite wall portions of the round hole 37 in bracket 17 and compressed between opposed wall portions of the elongated opening 36 in the opposite legs 31 and 32 of the bracket. The increased resiliency of the bushings 41, obtained by the staggered grooves 51 and 54, after being compressed is advantageous in a mounting of the type disclosed for a relatively high speed motor. This motor mounting amply supports the motor during tumbling of a refrigerator cabinet to produce shocks and jars simulating those encountered by such cabinets while being shipped in box cars or the like. My discovery in regard to staggering the opposed grooves in isolating or mounting elements has brought forth a feature which is particularly applicable to yieldable mounting bushings of the rubber-like type. Tests show that the degree of increased resiliency of mounting bushings obtained by grooving same and arranging the grooves in staggered relation as herein disclosed over bushings not so grooved and arranged deadens or prevents the transmission of high frequency vibrations and noises from a fast operating motor and fan to its support and to walls of a refrigerator cabinet. The bushings disclosed are preferably molded with the grooves therein although they could be extruded, severed to the proper length and the grooves or serrations then cut therein.

From the foregoing it should be apparent that I have provided a simplified and improved low cost, efficient yieldable carrying and isolating arrangement for a fan or the like motor. My mounting serves to permit the motor to freely move in all directions under severe shocks or jars with its movement cushioned or snubbed while at the same time the increased resiliency of the yieldable bushings, derived by arranging grooves therein as disclosed, serves to prevent high frequency vibrations or noises generated by the motor or fan from being transmitted to a refrigerator cabinet where they would be amplified and rendered audible. My invention also provides yieldable mounting bushings with greater compressibility without damaging same while being compressed to thus speed up and facilitate assembly or connection of the motor to the mounting bracket therefor.

While the form of embodiment of the invention as herein disclosed constitutes a preferred form, it is to be understood that other forms might be adopted, as may come within the scope of the claim which follows.

What is claimed is as follows:

In combination, a motor and a housing therefor, a plurality of circumferentially spaced apart opposed studs projecting laterally from said housing intermediate ends of said motor, a split bracket including an arcuate shaped portion and a flat base portion surrounding said motor housing and provided with openings receiving said studs, said bracket having an integral supporting leg extending from the flat base portion thereof and secured to a support, means for yieldably mounting said motor to said bracket, said mounting means comprising resilient rubber-like bushing elements disposed over said studs, said bushing elements each having an enlarged section with a fluted surface bearing against said motor housing, a reduced section fitting in the openings of said bracket and a fluted shoulder intermediate said sections abutting the inner face of the barcket, an end of said split bracket being drawn into overlapping relationship with another end thereof at said flat base portion and being rigidly tied to one another, and the drawing and tying of said ends of said bracket simultaneously compressing said enlarged fluted section of each of said bushing elements between the inner face of said bracket and said motor housing to prevent tilting of said motor relative to the bracket and to reduce transmission of noise and vibrations of said motor to said bracket and said support.

References Cited in the file of this patent

UNITED STATES PATENTS

| | | |
|---|---|---|
| 1,988,319 | King | Jan. 15, 1935 |
| 2,114,200 | Woodruff | Apr. 12, 1938 |
| 2,136,097 | Browne | Nov. 8, 1938 |
| 2,294,904 | Hewitt | Sept. 8, 1942 |
| 2,386,463 | Hile | Oct. 9, 1945 |
| 2,451,970 | Odor | Oct. 19, 1948 |
| 2,549,692 | Lentz | Apr. 17, 1951 |